(12) United States Patent
Morley

(10) Patent No.: US 6,922,075 B1
(45) Date of Patent: Jul. 26, 2005

(54) LOW POWER DRIVER CIRCUITRY

(75) Inventor: Sean Morley, Limerick (IE)

(73) Assignee: Analog Devices, Inc., Norwood, MA (US)

( * ) Notice: Subject to any disclaimer, the term of this patent is extended or adjusted under 35 U.S.C. 154(b) by 12 days.

(21) Appl. No.: 10/370,255

(22) Filed: Feb. 20, 2003

(51) Int. Cl.[7] .................................................. H03K 17/16
(52) U.S. Cl. ........................................................ 326/30
(58) Field of Search ......................... 323/313, 315, 323/316, 317; 326/21, 26, 30, 31, 33, 80, 82, 86, 90

(56) References Cited

U.S. PATENT DOCUMENTS

| | | | | |
|---|---|---|---|---|
| 4,748,346 A | * | 5/1988 | Emori | 326/90 |
| 5,760,601 A | * | 6/1998 | Frankeny | 326/30 |
| 5,939,926 A | * | 8/1999 | Uber | 327/382 |
| 6,051,990 A | * | 4/2000 | Uber | 326/33 |

* cited by examiner

*Primary Examiner*—Matthew V. Nguyen
(74) *Attorney, Agent, or Firm*—Wolf, Greenfield & Sacks, P.C.

(57) ABSTRACT

Driver circuitry is described. The circuitry is specifically adapted for use in transmission line environments and provides an offset and swing voltage at an output thereof. The voltages provided at the output are both provided by a current source provided within the driver circuit and coupled to a differential pair current switch.

27 Claims, 5 Drawing Sheets

LOW POWER DRIVER CIRCUITRY

FIELD OF THE INVENTION

The invention relates to driver circuitry and particularly to driver circuitry for use in transmission line environments. The invention is particularly directed towards low power driver circuits used in high speed applications such as with 50 Ω transmission lines.

BACKGROUND TO THE INVENTION

For many high-speed applications, a 50Ω transmission line environment is used to carry signals from one point to another while preserving their characteristics. Typically, a driver circuit transmits the information signals to the transmission line for transmission to their destination. For digital communication applications, the key signal characteristics that are desirable to preserve are: pulse amplitude, fast rise and fall times, and low jitter.

In a transmission line environment, the output of the transmission line must be terminated with its characteristic impedance, generally 50Ω, in order to prevent signal reflections from the load back to the source or driver. This is called the load termination. If reflections do occur, the signal characteristics may be degraded. In systems operating at higher frequencies it becomes increasingly difficult to ensure that the load termination impedance is equal to the characteristic impedance at all frequencies of interest as parasitic inductances and capacitances begin to have a larger effect at the higher frequencies. This means that at high frequencies, there will be some reflections from the load back to the driver. In these cases, by terminating the driver end of the transmission line with its characteristic impedance, these reflections from the load will be absorbed in the source termination rather than being reflected back to the load where they would degrade the signal characteristics. This source termination is achieved by having the impedance looking back into the driver output be equal to the transmission line characteristic impedance for all frequencies of interest.

Figure 1:
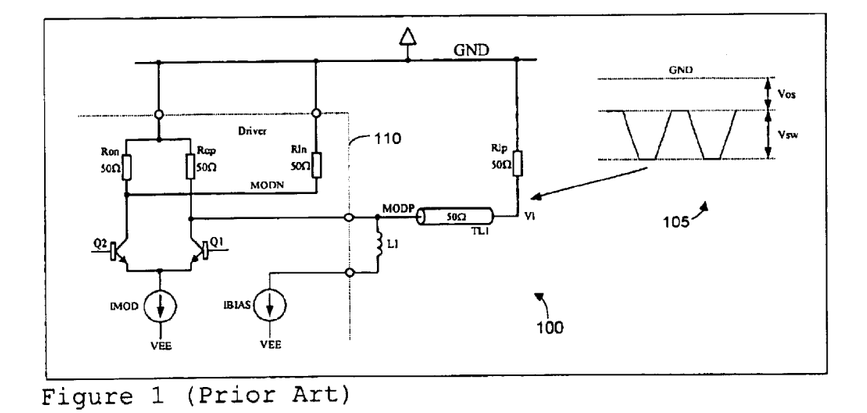
FIG. 1 is a schematic of a prior art driver circuit for use in a transmission line environment.

FIG. 1 shows a particular example of a transmission line environment 100 being used to generate the digital waveform 105 shown at the load. A driver circuit, shown within the dashed box 110, drives the transmission line TL1 with a series of pulses to generate a required digital waveform. TL1 represents the transmission line with a 50Ω characteristic impedance. It is terminated with a 50Ω resistor, Rlp. When a transmission line is terminated with its characteristic impedance, the impedance looking into the input of the transmission line is equal to the characteristic impedance. In FIG. 1, at the point labelled MODP, the impedance to the right looking into the transmission line is 50Ω, and the impedance looking to the left into the driver output is 50Ω(Rop) since the output impedance of Q1 is high. Rop acts as a source termination resistor.

The desired waveform at the load consists of a series of pulses to represent a serial stream of logic '1's and logic '0's. The amplitude of the pulses is Vsw, the swing voltage. For this particular application, it is also required that the pulse waveform be offset below GND by the offset voltage, Vos. A "differential pair current switch" driver generates the swing voltage. Using appropriate drive signals at the base terminals of Q1 and Q2, the current IMOD is either all flowing in Q1 or all flowing in Q2. Assuming for now that the current IBIAS is zero, when IMOD is flowing in Q2, no current flows in the parallel combination of Rop and Rlp and hence, the voltage at the load, Vl, is equal to GND. When all of IMOD is flowing in Q1, IMOD flows in the parallel combination of Rop and Rlp. In this case, Vl is as described in eqn. 1.

$$Vl=IMOD\times50\ \Omega\|50\Omega=IMOD\times25\ \Omega \qquad \text{Eqn. 1}$$

The swing voltage is the difference in the voltage at the load between the case when IMOD is switched to Q2 and when IMOD is switched to Q1:

$$Vsw=IMOD\times25\Omega \qquad \text{Eqn. 2}$$

From Eqn. 2, it can be seen that controlling the DC current IMOD controls the amplitude of the pulse waveform.

The DC IBIAS current is used to set the amplitude of the offset voltage Vos. IBIAS flows in the parallel combination of Rop and Rlp offsetting the pulse waveform below GND.

$$Vos=IBIAS\times25\Omega \qquad \text{Eqn. 3.}$$

The example shown in FIG. 1 is of a single-ended output driver and as such the complementary side of the differential pair current switch should be terminated with Rln to balance the load seen on both sides of the current switch. This resistor may be provided either internally on, or coupled externally to, the driver circuit. The provision of this resistor ensures that the resistance at the collectors of both Q1 and Q2 is the same. In FIG. 1, it can be seen that the resistance at the collector of Q1, being Rop in parallel with Rlp, is equal to the resistance of at the collector of Q2, being Ron in parallel with Rln, as required. Since the currents and load resistances are the same, the voltage at both collectors will also be the same, which is important for waveform integrity at the output. However, it will be appreciated that the degree of balancing of the loads can be traded off against some other aspect, so that in some cases Rln may not be the same value as Rlp.

The external inductor, L1, is used to decouple the capacitance of the IBIAS current source from the MODP output. The MODP is the high frequency output and if the IBIAS current source was directly connected to it, the pulse characteristics would be degraded by the presence of extra parasitic capacitance. The main degradation would be an increase in the rise and fall times.

One typical use or implementation of such driver circuits is in the digital transmission of signals over a fiber optic link. Such transmission consists of switching of laser light between a low level and a high level. Optical transmitters can be divided into two categories, those that use direct modulation, and those that use external modulation. With direct modulation, the laser light is switched between the high and low levels by switching the laser current between two levels. With external modulation, the laser is operated at a fixed optical power level and another device called an external modulator is used to modify the intensity of the laser light, thereby switching the transmitted optical output power between two levels. An EA (Electro-Absorption) modulator is one type of external modulator.

Figure 2:
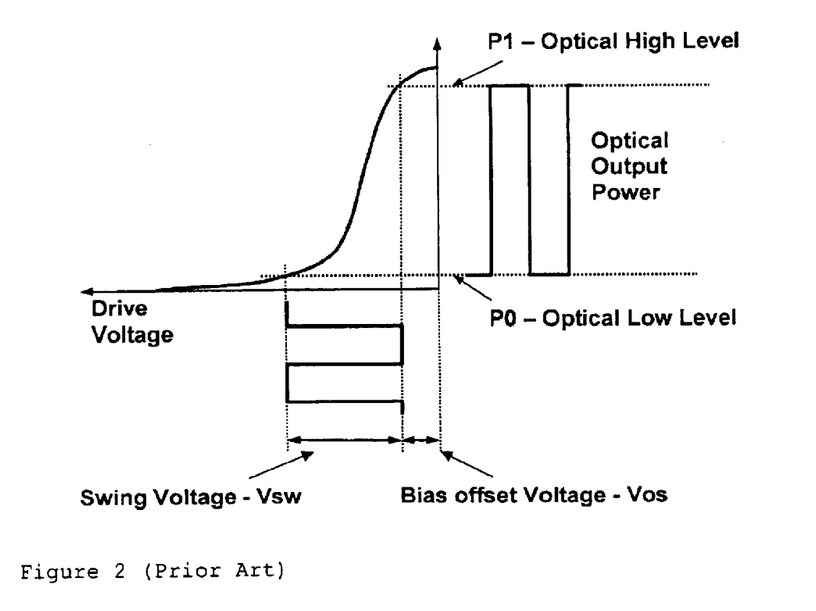
FIG. 2 is an example of a typical EA modulator drive signal.

FIG. 2 shows a typical EA modulator electrical to optical transfer function and the drive signal that is applied to the modulator. The switching signal has an amplitude Vsw, the swing voltage. It is offset from ground by Vos, the bias offset voltage. When the input data is "0" both the swing and offset voltages are applied to the modulator. When the input data is "1" only the bias offset voltage is applied to the modulator. Typical swing voltages are in the 0.5V to 2.5V range, and typical bias offset voltages are between 0.25V and 1.2V.

Figure 3:
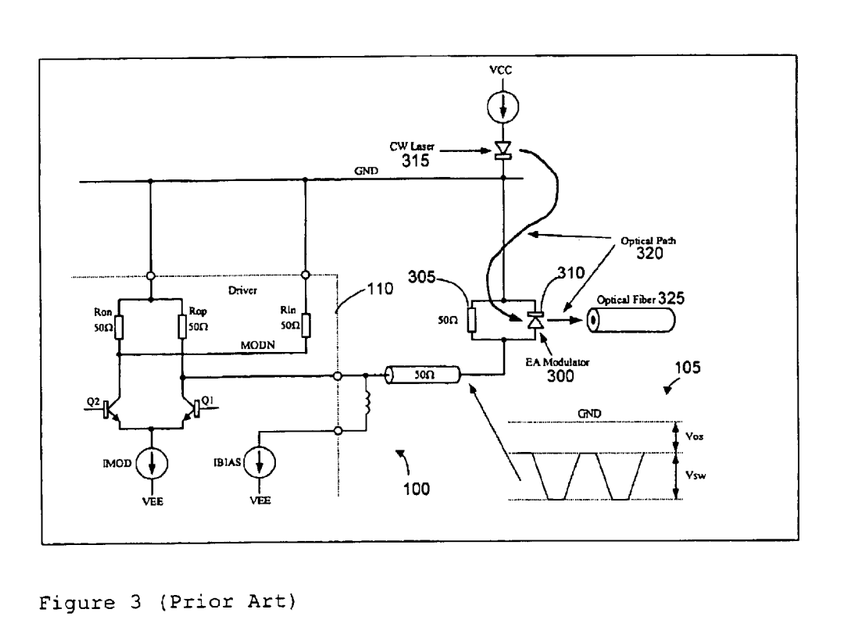
FIG. 3 is a schematic of the driver circuit of FIG. 1 as implemented with an EA modulator.

FIG. 3 shows a combination of the driver circuit of FIG. 1 together with an EA modulator 300 as would typically be implemented in a fiber-optic transmitter application. As will be seen from FIG. 3, the 50Ω load, Rlp, that was present in FIG. 1 has been replaced by the EA modulator circuitry. EA modulator modules are designed for use in a 50Ω transmission line environment. The Electro-Absorption Modulated Laser (EML) has a 50Ω termination 305 integrated in the module. This termination resistor is in parallel with the modulator, which in FIG. 3 is represented by a reverse biased photo-diode 310. The reverse biased diode has a higher impedance than 50Ω, so the parallel combination has a resistance close enough to 50Ω to provide a good termination of the transmission line. With the appropriate drive voltage across the modulator, the light from a CW laser 315 is switched between low and high power levels to represent the digital data stream. It will be apparent from FIG. 3 that the optical output 320 from the laser 315 is modulated by the modulator prior to its transmission along the optical fiber 325.

It will be appreciated that, although the driver application described above is for a specific fiber optic transmitter application, as far as the driver is concerned, its load is a terminated transmission line. The same driver topology could be used in other applications where a similar type of drive signal is required and the load is a terminated transmission line.

It will be appreciated that, in order to create the required offset which is required for this controlled impedance application, the circuitry of FIGS. 1 and 3 requires a separate IBIAS current to generate the offset. The specific offset is established by IBIAS flowing in Rop and Rlp. The requirement for a specific source of this IBIAS current requires a separate pin and external inductor to prevent the capacitance of the IBIAS current source from reducing the speed, i.e. the rise/fall times. It will be further understood that an individual source of IBIAS increases the power requirements of the driver circuit.

There is therefore a need for an alternative driver implementation that will utilise less pins that the prior art configurations and have reduced power requirements.

SUMMARY OF THE INVENTION

These needs and others are provided by a driver circuit of the present invention that obviates the requirement for a specific IBIAS source by enabling a use of the IMOD current, which is present in the circuitry, so as to be usable in the formation of swing and offset voltages at the output. This is desirably implemented by coupling an amplifier output to source termination resistors of the driver circuit.

In a first embodiment of the present invention, a driver circuit adapted to provide a desired waveform at an output thereof and thereby drive a terminated transmission line is provided. The waveform at the output has an amplitude defined by a swing voltage of the driver circuit and a voltage offset defined by an offset voltage of the driver circuit. The driver circuit includes a pair of source termination resistors, first and second nodes providing first and second currents respectively, each current having a first and second level and being coupled to one of the pair of source termination resistors, the first and second level of each of the first and second currents being switchable in a complimentary fashion, and wherein an amplifier output is coupled to the pair of source termination resistors thereby effecting a current path from the first and second current nodes through the pair of source termination resistors such that the currents are usable in the formation of the swing and offset voltages.

The first and second currents, provided at the first and second nodes, are typically provided by a differential current switch. The differential current switch may be provided by a pair of transistors and a current source, each of the transistors being coupled to one of the termination resistors and wherein the current source of the switch is usable in the formation of the swing and offset voltages. Such transistors may be provided in an NPN or PNP configuration or alternatively implemented in CMOS.

The complementary switching between the two levels is desirably effected upon application of a control data signal.

Desirably, a common node between one of the pair of source termination resistors and the transistor coupled thereto forms an output for the driver circuit and a common node between the other of the pair of source termination resistors and the transistor coupled thereto is further coupled to a resistive load, the resistive load providing a balanced load on both sides of the current switch. The driver circuit and the resistive load may be formed on the same or on separate chips.

The transmission line is typically a 50 Ω transmission line.

In certain embodiments the circuit is operatable from a positive supply and ground, whereas other embodiments may require the operation from a negative supply and ground.

In modifications to the preferred embodiment, the driver circuit is further adapted to provide a second desired waveform at an output thereof, the first and second output waveforms being provided to switch between two levels in complementary fashion. Such switching is desirably effected under control of an applied digital data stream.

The combination of the resistive load provided by the terminated transmission line and at least one of the source termination resistors desirably forms a resistive voltage divider between the voltage at the amplifier output and the voltage at the output of the driver circuit, such that a control of the voltage at the amplifier output effects a control of the offset voltage.

The invention also provides a fiber optic transmitter comprising an optical modulator coupled to a driver circuit, the driver circuit being adapted to provide a desired waveform at an output thereof and thereby drive a terminated transmission line, the waveform having an amplitude defined by a swing voltage of the driver circuit and a voltage offset defined by an offset voltage of the driver circuit, the driver circuit including:

a pair of source termination resistors, a differential current switch including a current source, the switch providing a first and second current, each current having a first and second level and being coupled to one of the pair of source termination resistors, the first and second level of each of the first and second currents being switchable in a complimentary fashion, the amplifier output being coupled to the pair of source termination resistors thereby effecting a current path from the first and second currents through the pair of source termination resistors such that the currents are usable in the formation of the swing and offset voltages, and wherein the swing and offset voltages are coupled across the modulator, thereby controlling the intensity of a laser beam transmitting a digital data stream through an optical fiber.

The optical modulator is typically an electro-absorption modulator.

In accordance with another embodiment of the invention a line driver having a substantially constant output impedance for providing an output signal at an output node thereof in response to an input signal is provided. In such an embodiment, the driver comprises:
- a first and second transistor,
- a constant current source,
- a first and second biasing resistor, and
- the first and second transistors are provided in a paired configuration sharing the current source, the first transistor being coupled to the first biasing resistor and the second transistor being coupled to the second biasing resistor, the biasing resistors sharing a common node, the common node being biased by an applied voltage so as to provide an offset voltage at the circuit output node.

In yet a further embodiment, a driver circuit for transmitting data via a transmission line to a receiver is provided. The driver circuit is coupled to the transmission line in order to modulate the voltage on the transmission line in accordance with the data to be transmitted, and includes a pair of source termination resistors and a differential pair current switch having a pair of transistors and a current source. An amplifier output is coupled to the pair of source termination resistors thereby effecting a current path from the current source of the differential pair current switch through the pair of source termination resistors such that the current source of the differential pair current switch is usable in determining the amplitude and offset of the modulated voltage on the transmission line.

In another embodiment a line driver having a substantially constant output impedance for providing an output signal at an output node thereof in response to an input signal is provided, the driver comprising:
- a first and second transistor,
- a constant current source,
- a first and second biasing resistor, and
- wherein the first and second transistors are provided in a paired configuration sharing the current source, the first transistor being coupled to the first biasing resistor and the second transistor being coupled to the second biasing resistor, the first and the second transistor being adapted to provide a dual level output, and wherein the output of the first transistor at any time is the complement of the output of the second transistor, the biasing resistors sharing a common node, the common node being biased by an applied voltage so as to provide an offset voltage at the circuit output node.

The invention additionally provides a method of driving a transmission line in response to an applied data stream, the method comprising the step of:
- providing offset and swing voltages at an output of a driver circuit, the driver circuit having a current source coupled to a differential current switch, this current source being usable in the formation of these voltages, and wherein the switching of the differential current switch is in response to characteristics of the applied data stream.

The method may additionally include the step of providing an amplifier output to a common node of source termination resistors provided within the driver circuit, the coupling of the amplifier within the driver circuit providing a current path for the current source so as to enable its use in the formation of the swing and offset voltages.

These and other features of the present invention will be better understood with reference to the following drawings.

DETAILED DESCRIPTION OF THE DRAWINGS

FIGS. 1 to 3 have been described with reference to the prior art.

Figure 4:
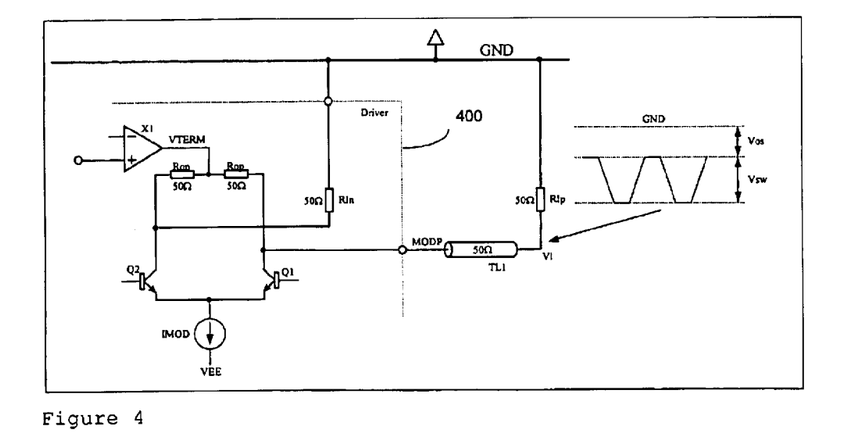
FIG. 4 is a schematic of a driver circuit for use in a transmission line environment according to a first embodiment of the present invention.

FIG. 4 shows an implementation of a driver circuit 400 adapted to generate a required output signal according to the present invention. An amplifier, X1, is used to drive the common point between the source termination resistors, Rop and Ron. X1 has a low impedance at its output that provides an AC ground at this point. Looking back into the MODP output (which is the common node between the source termination resistor Rop and transistor Q1), the impedance is still 50Ω(Rop) since Rop goes to an AC ground and the output impedance of Q1 is high. Rop acts as the source termination resistor similar in fashion to how it does in FIG. 1. Again similarly to that described with reference to FIG. 1, the coupling of a resistive load Rln to a common node between source termination resistor Ron and transistor Q2 provides for a balancing of the load across the differential switch which is provided between by the two transistors and the current source IMOD. The swing voltage is generated in the same way as it is in FIG. 1. The differential current switch switches current into the parallel combination of Rop and Rlp. Therefore, the swing voltage is the same as described in eqn. 2:

$$V_{SW} = IMOD \times 25\Omega \qquad \text{Eqn. 4}$$

Rop and Rlp also form a resistive voltage divider between VTERM and VL. By controlling the DC voltage at VTERM with the amplifier X1, the offset voltage is controlled.

$$V_{OS} = VTERM \times \frac{Rlp}{Rop + Rlp} = \frac{VTERM}{2} \qquad \text{Eqn. 5}$$

From FIG. 4, it is clear that the IBIAS pin and the IBIAS inductor have been eliminated. This reduces the number of devices that are connected to the high-speed output, increasing the maximum possible speed. This increment in speed accorded by the circuit of FIG. 4 with respect to the prior art implementation of FIG. 1 can be explained as follows. In FIG. 1, L1 is required to decouple the capacitance of the IBIAS output from the MODP output. While this prevents a severe increase in rise/fall time, L1 itself has some parasitic capacitance, which causes some increase in rise/fall time over the case in FIG. 4 where there is no extra devices connected to the output other than Q1, Rop, and the transmission line and load, all of which are also present in FIG. 1. It will be further appreciated that the elimination of L1 also represents a saving in component space and cost.

From an initial examination of the circuitry of the present invention it may be thought that the circuitry as provided by the invention is more complex than that provided in prior art implementations. It will be appreciated that the circuitry does however provide a number of key advantages such as reduced power dissipation and that this benefit of the power savings far outweighs any perceived drawbacks due to what may be thought of as increased design complexity.

The reason why this topology may be implemented with lower power dissipation is because it re-uses the IMOD current in the generation of the offset voltage, while the topology in FIG. 1 requires a separate IBIAS current to generate the offset. In FIG. 1, when IMOD is flowing in Q2, its only path is through Ron and Rln to GND. Therefore, during this state, it can have no effect on the offset voltage, which is created by IBIAS flowing in Rop and Rlp. In FIG. 4, when IMOD is flowing in Q2, there is a path through Ron to VTERM and then through Rop and Rlp to GND. This path allows IMOD to play a part in the generation of the offset voltage.

An example comparing the existing prior art technique and that according to the present invention will now be described as means of clarification.

To compare the power dissipation of the new topology vs. the old topology, we will compare the current flowing from GND, through the circuit, to VEE.

Figure 5:
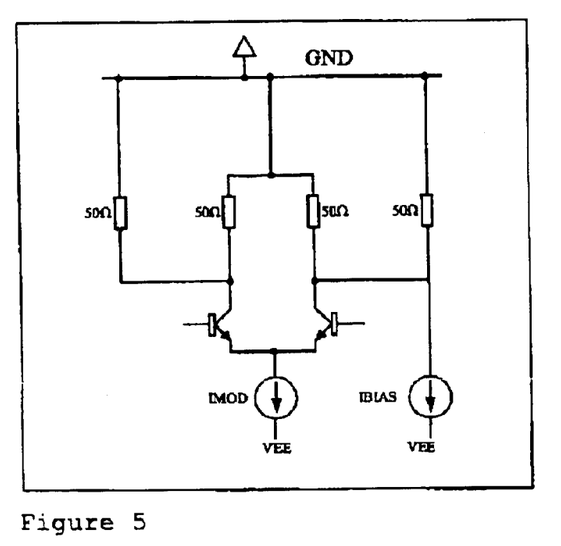
FIG. 5 is a simplification of the circuitry of FIG. 1.

FIG. 5 shows a simplification of the circuitry of FIG. 1, with L1 and TL1 removed for the sake of explanation as they don't affect the analysis of power dissipation. For the circuit in FIG. 5, at any given time, the DC IMOD current is being either steered through the left hand-side of the circuit, or through the right-hand side of the circuit. Therefore, the total current from GND to VEE in the circuit is:

$$IEE = IMOD + IBIAS \qquad \text{Eqn. 6}$$

where IBIAS and IMOD are related to Vsw and Vos as described in eqn. 2 and eqn. 3.

Figure 6:
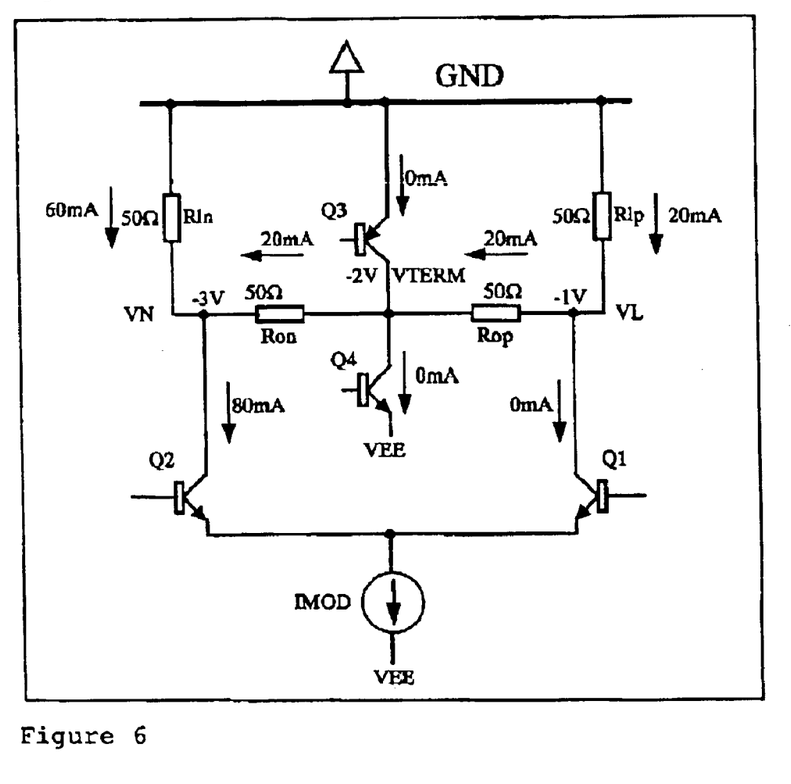
FIG. 6 is a simplification of the circuitry of FIG. 4.

FIG. 6 is a simplification of the circuit in FIG. 4, and similarly to FIG. 5 only includes the components which contribute to an analysis of power dissipation. Q3 and Q4 represent the output stage of the amplifier X1, since currents in the output stage contribute to the power dissipation. Depending on the swing voltage and the offset voltage, either Q3 is carrying current or Q4 is carrying current. If Q4 is carrying no current, then the only path for current from GND, through the circuit to VEE is through IMOD. Therefore, the total current is equal to IMOD. For these combinations of swing voltage and offset voltage, the current saving is equal to IBIAS. The currents and voltages shown in FIG. 6 correspond to one of these conditions. The swing voltage is 2V and the Offset voltage is −1V. From eqn.4, and using the values represented in FIG. 6, IMOD is 80 mA, and from eqn. 5, VTERM is −2V. FIG. 6 shows the state when IMOD is flowing in Q2. 60 mA of IMOD flows from GND through Rln. The remaining 20 mA of IMOD flows from GND through Rlp, Rop, and Ron. This 20 mA flowing in Rlp creates the offset voltage of −1V. When IMOD is switched to Q1, the circuit is a mirror image of that shown in FIG. 6. VL will now be at −3V. Since VL switched between −1V and −3V, the swing voltage is 2V as required. No current flows in either Q3 or Q4 and the total current in the circuit is IMOD. For the circuit in FIG. 1, 40 mA of IBIAS is required to generate a −1V offset and that is a significant percentage of the total current. The supply current is 80 mA for the new topology compared to 120 mA for the old topology.

For other combinations of swing and offset voltage for which Q4 is carrying some current, the total current is more than IMOD, but less than IBIAS+IMOD for the old topology, hence, the topology according to the present invention will operate with lower power requirements than prior art implementations.

Figure 7:
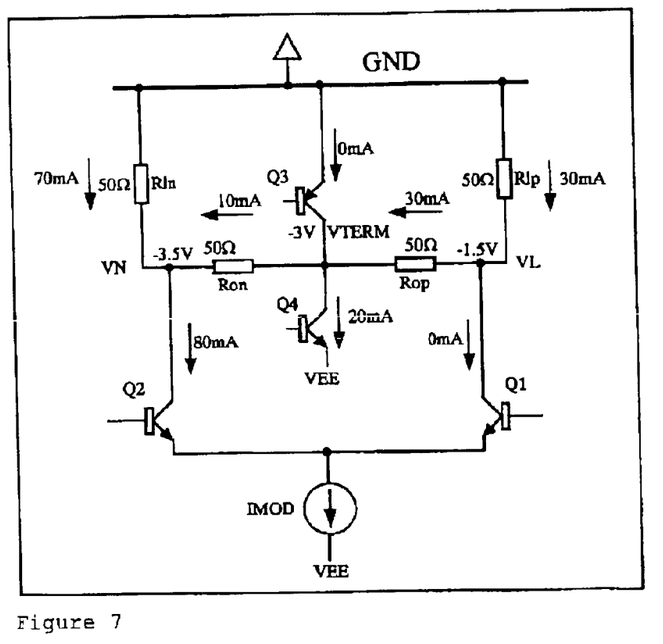
FIG. 7 is similar to FIG. 6, implemented with different component values.

FIG. 7 shows a further example of the present invention where the swing voltage is 2V and the offset voltage is −1.5V. In this case, Q4 is carrying 20 mA, so the total current is IMOD+20 mA. For the old topology, as determined by eqn. 3, 60 mA of IBIAS is required to generate a −1.5V offset voltage. This demonstrates that power saving for the new topology is still significant for cases where Q4 is carrying current. The supply current is 100 mA for the new topology compared to 140 mA for the old topology.

It will be appreciated that all the examples shown thus far with reference to an implementation of the present invention have been with reference to a 50Ω transmission line environment but the benefits of the new topology apply to any controlled impedance environment for example, a 25Ω transmission line environment.

Additionally, although FIGS. 4, 6, and 7 has been described with all the resistors shown as having values equal to the characteristic impedance of the transmission line, there are cases where it is desirable to use alternative resistor values to further reduce power dissipation or to make tradeoffs for headroom optimisation, or for other reasons. Such modifications are, it will be appreciated, within the spirit and scope of the present invention and will be appreciated as providing power dissipation, or other advantages.

Figure 8:
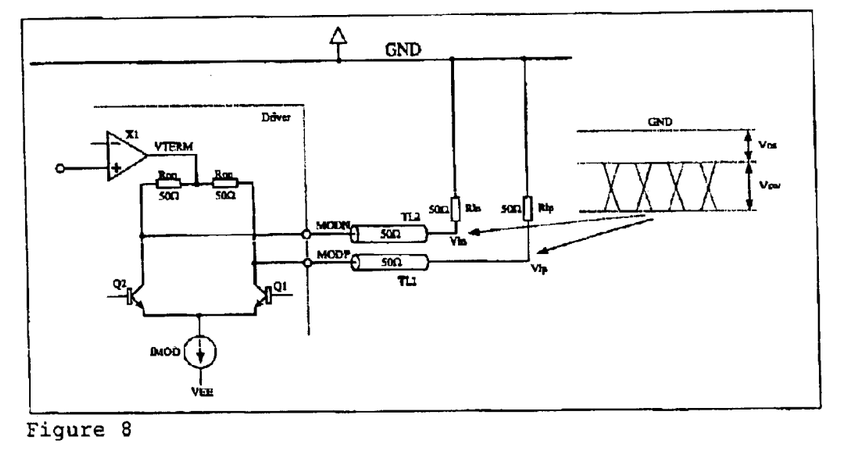
FIG. 8 is a schematic of a driver circuit according to the present invention implemented for a differential output.

It will be further understood that the circuitry described herein with reference to FIG. 4 has been to a single ended output driver, but that the topology can be adapted for a differential output driver and the power savings still apply. FIG. 8 shows such a modification. In FIG. 8, a second output node, MODN is provided at the output of the driver circuitry and is coupled via Rln to GND, in a similar fashion to the coupling of MODP through Rlp to ground for the earlier described embodiments. Such a modification enables the provision of complementary waveforms at the output of the driver circuit, the waveforms being switchable upon application of a control signal, typically a digital data stream.

Figure 9:
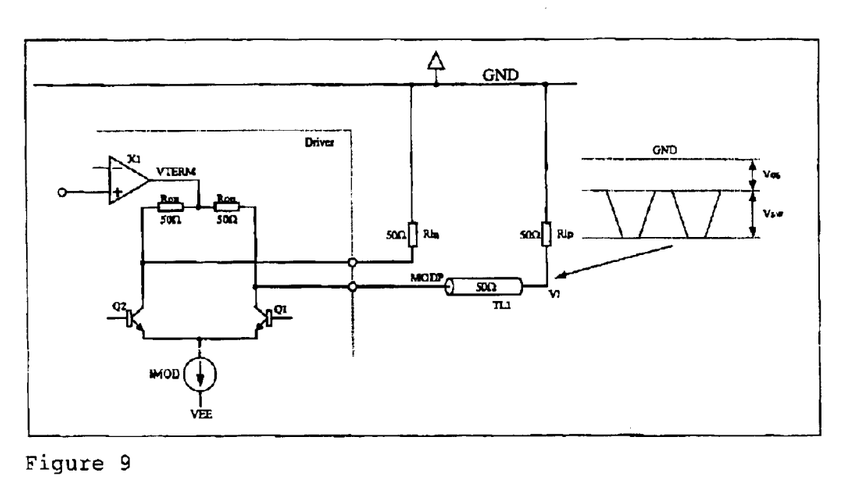
FIG. 9 is a schematic similar to FIG. 4 of the driver circuit of the present invention, but with the resistive load Rln provided externally to the driver circuit.

It will be appreciated that the present invention has been described with reference to the resistor Rln being provided internally in the driver circuit, as shown in FIG. 4. However, as previously mentioned, this resistance may also be provided to the driver circuit externally (i.e. off-chip). FIG. 9 shows a schematic of the driver circuit of the present invention when Rln is provided as an external connection to the driver chip.

Figure 10:
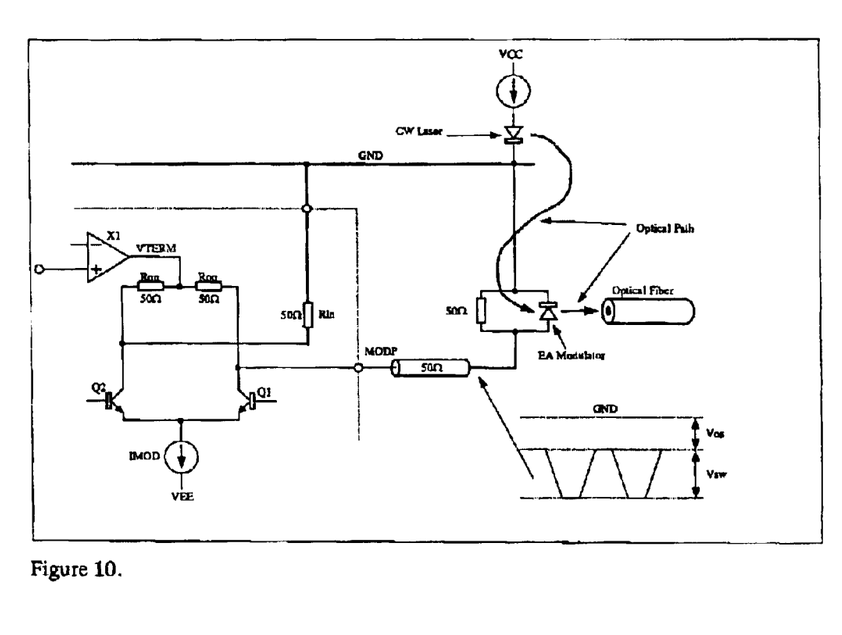
FIG. 10 is a schematic of the driver circuit of the present invention being used to drive an Electro Absorption Modulator in a fibre-optic transmitter application.

Hereintobefore, the invention has been described simply by reference to a driver circuit adapted to drive a terminated transmission line without reference to the use that is made of the resulting signal that appears across the load termination. As was detailed in the section "Background to the Invention" typical implementations of driver circuits is in the transmission of optical signals along a fiber optic cable path. Similarly to that described before, the driver circuitry of the present invention may be used to generate a drive signal for an optical modulator such as an Electro Absorption or EA modulator in fiber-optic transmitter applications. FIG. 10 shows such an implementation. In this application, the circuit is arranged so that the driver voltage that appears across Rlp also appears across the EA modulator. This voltage then controls the optical absorption of the modulator so as to modulate the intensity of a laser beam transmitting a digital data stream through an optical fiber.

It will be appreciated that the circuitry of the present invention is an improvement over prior art implementations in that it includes, amongst others, the following advantages:

Lower power dissipation.

Elimination of the IBIAS pin.

Elimination of the external IBIAS inductor.

Although the present invention has been described with reference to specific embodiments it will be appreciated that numerous modifications can be made to the configurations and topologies herein described without departing from the spirit and scope of the present invention. For example, the circuit could be adapted to operate between a positive supply voltage and ground rather than and a negative supply voltage, as shown. It will also be appreciated that it is not intended to limit the implementation of the present invention to a purely N-type transistor implementation. For example, PNP transistors could be used instead of NPN transistors if the circuit was inverted. Similarly the circuit could be adapted to be used with CMOS technology.

Furthermore, the provision of complementary currents coupled to the source termination resistors has been described with reference to a specific switched transistor configuration. It will be apparent to those skilled in the art that other configurations could be substituted for the transistor/current source configuration described herein and still provide the functionality of the switch described. Accordingly, it will be appreciated that it is not intended to limit the invention except as may be deemed necessary in the light of the appended claims.

Furthermore, the words "comprises/comprising" and the words "having/including" when used herein with reference to the present invention are used to specify the presence of stated features, integers, steps or components but does not preclude the presence or addition of one or more other features, integers, steps, components or groups thereof.

What is claimed is:

1. A driver circuit adapted to provide a desired waveform at an output thereof and thereby drive a terminated transmission line, the waveform having an amplitude defined by a swing voltage of the driver circuit and a voltage offset defined by an offset voltage of the driver circuit, the driver circuit including:
   a pair of source termination resistors,
   a first node providing a first current and second node providing a second current, each node being coupled to one of the pair of source termination resistors, each current having a first and second level, the first and second levels of each of the currents being switchable in a complimentary fashion,
   and wherein an amplifier output is coupled to the pair of source termination resistors thereby effecting a current path from the first and second nodes through the pair of source termination resistors such that the currents are usable in the formation of the swing and offset voltages.

2. The driver circuit as claimed in claim 1 wherein the first and second currents provided at the nodes are provided by a differential current switch.

3. The driver circuit as claimed in claim 2 wherein the differential current switch is provided by a pair of transistors and a current source, each of the transistors being coupled to one of the termination resistors and wherein the current source of the switch is usable in the formation of the swing and offset voltages.

4. The driver circuit as claimed in claim 1 wherein the complementary switching between the two levels is effected upon application of a control data signal.

5. The driver circuit of claim 1 wherein the transmission line is a 50 Ω transmission line.

6. The driver circuit of claim 1 wherein the circuit is operatable from a positive supply and ground.

7. The driver circuit of claim 1 wherein the circuit is operatable from a negative supply and ground.

8. The driver circuit as claimed in claim 1 being further adapted to provide a second desired waveform at an output thereof, the first and second output waveforms being provided to switch between two levels in complementary fashion.

9. The driver circuit as claimed in claim 8 wherein the switching is effected under control of an applied digital data stream.

10. The driver circuit as claimed in claim 1 wherein the combination of the transmission line termination resistance and at least one of the source termination resistors forms a resistive voltage divider between the voltage at the amplifier output and the voltage at the output of the driver circuit, such that a control of the voltage at the amplifier output effects a control of the offset voltage.

11. The driver circuit as claimed in claim 3 wherein a common node between one of the pair of source termination resistors and the transistor coupled thereto forms an output for the driver circuit and a common node between the other of the pair of source termination resistors and the transistor coupled thereto is further coupled to a resistive load, the resistive load providing a balanced load on both sides of the current switch.

12. The driver circuit as claimed in claim 11 wherein the resistive load is not formed on the same chip as the driver circuit.

13. The driver circuit as claimed in claim 11 wherein the combination of the transmission line termination resistance and at least one of the source termination resistors forms a resistive voltage divider between the voltage at the amplifier output and the voltage at the output of the driver circuit, such that a control of the voltage at the amplifier output effects a control of the offset voltage.

14. The driver circuit as claimed in claim 13 wherein the resistive value of at least one of the pair of source termination resistors and at least one of the resistive loads differs from at least one other of the pair of source termination resistors and at least one of the resistive loads.

15. The driver circuit as claimed in claim 1 wherein a first node forms an output for the driver circuit thereby driving the terminated transmission line and the other node is further coupled to a resistive load, the resistive load providing a balanced load across the first and second nodes.

16. The driver circuit as claimed in claim 15 wherein the resistive load is not formed on the same chip as the driver circuit.

17. The driver circuit as claimed in claim 15 wherein the combination of the transmission line termination resistance and at least one of the source termination resistors forms a resistive voltage divider between the voltage at the amplifier output and the voltage at the output of the driver circuit, such that a control of the voltage at the amplifier output effects a control of the offset voltage.

18. The driver circuit as claimed in claim 17 wherein the resistive value of at least one of the pair of source termination resistors and at least one of the resistive loads differs from at least one other of the pair of source termination resistors and at least one of the resistive loads.

19. The driver circuit as claimed in claim 3 wherein the transistors are implemented in an NPN configuration.

20. The driver circuit as claimed in claim 3 wherein the transistors are implemented in a PNP configuration.

21. The driver circuit as claimed in claim 1 when implemented in CMOS.

22. A fiber optic transmitter comprising an optical modulator coupled to a driver circuit, the driver circuit being adapted to provide a desired waveform at an output thereof and thereby drive a terminated transmission line, the waveform having an amplitude defined by a swing voltage of the driver circuit and a voltage offset defined by an offset voltage of the driver circuit, the driver circuit including:

a pair of source termination resistors, a differential current switch including a current source, the switch providing a first and second current, each current having a first and second level and being coupled to one of the pair of source termination resistors, the first and second level of each of the first and second currents being switchable in a complimentary fashion, an amplifier output being coupled to the pair of source termination resistors thereby effecting a current path from the first and second currents through the pair of source termination resistors such that the currents are usable in the formation of the swing and offset voltages, and wherein the swing and offset voltages are coupled across the modulator, thereby modulating the intensity of a laser beam transmitting a digital data stream through an optical fiber.

23. The fiber optic transmitter as claimed in claim 22 wherein the optical modulator is an electro-absorption modulator and the modulation of the intensity of the laser beam is effected by controlling the optical absorption of the modulator.

24. A line driver having a substantially constant output impedance for providing an output signal at an output node thereof in response to an input signal, the driver comprising:

a first and second transistor, a constant current source, a first and second biasing resistor, and wherein the first and second transistors are provided in a paired configuration sharing the current source, the first transistor being coupled to the first biasing resistor and the second transistor being coupled to the second biasing resistor, the biasing resistors sharing a common node, the common node being biased by an applied voltage so as to provide an offset voltage at the circuit output node.

25. A driver circuit for transmitting data via a transmission line to a receiver, the driver circuit coupled to the transmission line in order to modulate the voltage on the transmission line in accordance with the data to be transmitted, the driver including a pair of source termination resistors and a differential pair current switch having a pair of transistors and a current source, and wherein an amplifier output is coupled to the pair of source termination resistors thereby effecting a current path from the current source of the differential pair current switch through the pair of source termination resistors such that the current source of the differential pair current switch is usable in the formation of the swing and offset voltages.

26. A line driver having a substantially constant output impedance for providing an output signal at an output node thereof in response to an input signal, the driver comprising:

a first and second transistor, a constant current source, a first and second biasing resistor, and wherein the first and second transistors are provided in a paired configuration sharing the current source, the first transistor being coupled to the first biasing resistor and the second transistor being coupled to the second biasing resistor, the first and the second transistor being adapted to provide a dual level output, and wherein the output of the first transistor at any time is the complement of the output of the second transistor, the biasing resistors sharing a common node, the common node being biased by an applied voltage so as to provide an offset voltage at the circuit output node.

27. A method of driving a transmission line in response to an applied data stream, the method comprising:

providing offset and swing voltages at an output of a driver circuit, the driver circuit including a pair of termination resistors and a current source coupled to a differential pair current switch, the voltages being provided by this current source and wherein the switching of the differential current switch is in response to characteristics of the applied data stream; and coupling an amplifier output to a common node of the termination resistors, the coupling of the amplifier output providing a current Path from the current source so that the current source is usable in the generation of the swing and offset voltages.

* * * * *